(12) United States Patent
Kobayashi (10) Patent No.: US 11,535,062 B2
(45) Date of Patent: Dec. 27, 2022

(54) TYRE

(71) Applicant: Sumitomo Rubber Industries, Ltd., Kobe (JP)

(72) Inventor: Tatsuya Kobayashi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 856 days.

(21) Appl. No.: 16/381,888

(22) Filed: Apr. 11, 2019

(65) Prior Publication Data

US 2019/0337337 A1    Nov. 7, 2019

(30) Foreign Application Priority Data

May 2, 2018  (JP) .............................. JP2018-088857

(51) Int. Cl.
    *B60C 11/12* (2006.01)
    *B60C 11/03* (2006.01)

(52) U.S. Cl.
    CPC ........ *B60C 11/0304* (2013.01); *B60C 11/033* (2013.01); *B60C 11/1204* (2013.01); *B60C 11/1236* (2013.01); *B60C 2011/1209* (2013.01); *B60C 2011/1254* (2013.01)

(58) Field of Classification Search
    CPC . B60C 11/01; B60C 11/0304; B60C 11/1236; B60C 2011/0365
    See application file for complete search history.

(56) References Cited

U.S. PATENT DOCUMENTS

| 2012/0247632 | A1* | 10/2012 | Hayashi .............. B60C 11/0306 152/209.22 |
| 2016/0347125 | A1* | 12/2016 | Itou ...................... B60C 11/1236 |
| 2018/0215207 | A1 | 8/2018 | Hatanaka et al. |
| 2019/0061429 | A1* | 2/2019 | Yasunaga ................ B60C 11/13 |

FOREIGN PATENT DOCUMENTS

| CA | 1313116 | * | 1/1993 |
| EP | 2781372 A1 | | 9/2014 |
| JP | 05-178016 | * | 7/1993 |
| JP | 7-276924 A | | 10/1995 |
| JP | H07-276924 | * | 10/1995 |
| JP | 2007-112217 | * | 5/2007 |
| JP | 2016-159788 A | | 9/2016 |
| WO | WO 2014/038378 A1 | | 3/2014 |
| WO | WO 2017/043003 A1 | | 3/2017 |

OTHER PUBLICATIONS

English machine translation of JP2007-112217. (Year: 2007).*
English machine translation of JP05-178016. (Year: 1993).*
English machine translation of JPH07-276924. (Year: 1995).*
Extended European Search Report, dated Aug. 13, 2019, for European Application No. 19170109.3.

* cited by examiner

*Primary Examiner* — Robert C Dye
(74) *Attorney, Agent, or Firm* — Birch, Stewart, Kolasch & Birch, LLP (57) ABSTRACT

A tyre comprises a tread portion comprising a shoulder main groove and a shoulder land region. The shoulder land region includes an outer region, a middle region, and an inner region. The shoulder land region is provided with a plurality of shoulder sipes having components in a tyre axial direction. A sipe ratio of the middle region is smaller than the sipe ratio of the outer region and the sipe ratio of the inner region.

19 Claims, 5 Drawing Sheets

TYRE

TECHNICAL FIELD

The present invention relates to a tyre provided with shoulder land regions in a tread portion thereof.

BACKGROUND ART

In recent years, as vehicle performance is improved, there has been a demand for a tyre having excellent steering stability performance. From such a point of view, for the purpose of increasing cornering power, it has been proposed to decrease rubber thickness of the tread portion, for example (see Japanese Unexamined Patent Application Publication No. 2016-159788).

SUMMARY OF THE INVENTION

However, the tyres configured as such cannot sufficiently absorb vibration during running by tread rubber thereof, therefore, it is possible that ride comfort performance and noise performance tend to be easily deteriorated.

The present invention was made in view of the above, and a primary object thereof is to provide a tyre capable of suppressing decrease in the ride comfort performance and the noise performance while improving the steering stability performance.

In one aspect of the present invention, a tyre comprises a tread portion comprising a shoulder main groove extending continuously in a tyre circumferential direction on a side closest to a tread edge and a shoulder land region formed on an outer side in a tyre axial direction of the shoulder main groove, wherein the shoulder land region includes an outer region which is a region of 10% of a tread width axially outward from the tread edge, a middle region which is a region of 10% of the tread width axially inward from the tread edge, and an inner region between the middle region and the shoulder main groove, the shoulder land region is provided with a plurality of shoulder sipes having components in the tyre axial direction, and in each of the outer region, the middle region, and the inner region, when a ratio of a total opening area of the shoulder sipes included in the respective region to a total area of a ground contacting surface of the respective region is defined as a sipe ratio, the sipe ratio of the middle region is smaller than the sipe ratio of the outer region and the sipe ratio of the inner region.

In another aspect of the invention, it is preferred that the sipe ratio of the middle region is 70% or less of the sipe ratio of the outer region and the sipe ratio of the inner region.

In another aspect of the invention, it is preferred that the shoulder land region includes a tread edge region which is a region of 10% of the tread width with the tread edge being a center thereof in the tyre axial direction, and the plurality of the shoulder sipes include edge sipes each having one end in the tread edge region.

In another aspect of the invention, it is preferred that the shoulder land region includes an outer shoulder land region when a position of the tread portion mounted on a vehicle is specified, and the edge sipes of the outer shoulder land region include a first edge sipe having one end arranged on an inner side in the tyre axial direction of the tread edge and extending axially outwardly therefrom.

In another aspect of the invention, it is preferred that the plurality of the shoulder sipes includes a main sipe crossing the middle region of the outer shoulder land region.

In another aspect of the invention, it is preferred that the main sipe extends in a curved manner in the middle region.

In another aspect of the invention, it is preferred that an angle of the main sipe on the tread edge with respect to the tyre axial direction is in a range of from 35 to 55 degrees.

In another aspect of the invention, it is preferred that the shoulder land region includes an inner shoulder land region when a position of the tread portion mounted on a vehicle is specified, the edge sipes of the inner shoulder land region include a second edge sipe and a third edge sipe, the second edge sipe has the one end thereof arranged on the inner side in the tyre axial direction of the tread edge and extends axially inwardly therefrom, and the third edge sipe has the one end thereof arranged on the outer side in the tyre axial direction of the tread edge and extends axially outwardly therefrom.

In another aspect of the invention, it is preferred that the tread portion includes an inner middle land region adjacent in the tyre axial direction to the inner shoulder land region, the inner middle land region is provided with an inner middle lateral groove crossing the inner middle land region, the inner middle lateral groove has a first apex portion protruding toward one side in the tyre circumferential direction and a second apex portion arranged on an outer side of the vehicle of the first apex portion and protruding toward the other side in the tyre circumferential direction, when the inner middle land region is divided into three parts equally in the tyre axial direction, the inner middle land region includes a first region positioned outermost of the vehicle and a second region adjacent to the first region, the first apex portion is arranged in the second region, and the second apex portion is arranged in the first region.

DESCRIPTION OF THE PREFERRED EMBODIMENT

An embodiment of the present invention will now be described below in detail in conjunction with accompanying drawings.

Figure 1:
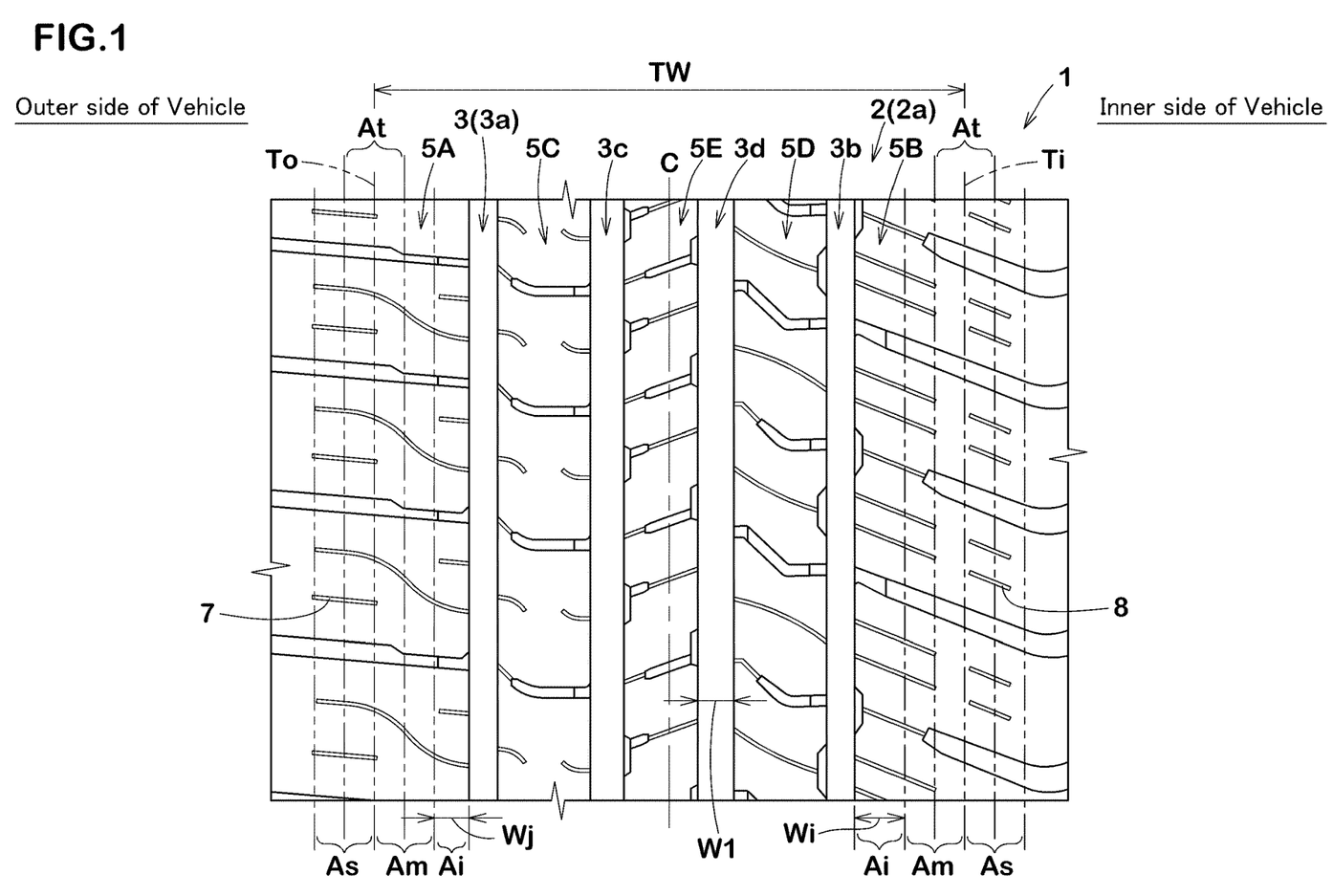
FIG. 1 is a development view of a tread portion of a tyre as an embodiment of the present invention.

FIG. 1 is a development view of a tread portion 2 of a tyre 1 in this embodiment. The tyre 1 in this embodiment is suitably used as a pneumatic tyre for a passenger car in which a tread rubber having low heat generating property is arranged. Note that the present invention is not limited to a tyre for a passenger car, but it is possible that the present invention is applied to a pneumatic tyre for heavy load or for a motorcycle, and a non-pneumatic tyre not filled with air, for example.

As shown in FIG. 1, the tread portion 2 in this embodiment has a tread pattern whose position when mounted on a vehicle is specified. The mounting position of the tyre 1 on a vehicle is indicated by letters or marks on at least one of sidewall portions (not shown), for example. In FIG. 1, left side corresponds to an outer side of the vehicle and right side corresponds to an inner side of the vehicle.

The tread portion 2 in this embodiment has an inner tread edge (Ti) located, when the tyre is mounted on a vehicle, on the inner side of the vehicle and an outer tread edge (To) located on the outer side of the vehicle when the tyre is mounted on the vehicle.

The tread edges (To) and (Ti) are defined as outermost ground contacting positions in a tyre axial direction when the tyre 1 in a standard state is in contact with a flat surface with zero camber angles by being loaded with a standard tyre load. The "standard state" is a state in which the tyre 1 is mounted on a standard rim (not shown), inflated to a standard inner pressure, and loaded with no tyre load. In this specification, dimensions and the like of various parts of the tyre are those measured under the standard state, unless otherwise noted. A distance in the tyre axial direction between the tread edges (Te) and (To) is defined as a tread width TW.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with main grooves 3 each extending continuously in a tyre circumferential direction. The main grooves 3 in this embodiment include an outer shoulder main groove (3a) and an inner shoulder main groove (3b), an outer crown main groove (3c), and an inner crown main groove (3d). The outer shoulder main groove (3a) in this embodiment is arranged closest to the outer tread edge (To). The inner shoulder main groove (3b) in this embodiment is arranged closest to the inner tread edge (Ti). The outer crown main groove (3c) is arranged between the outer shoulder main groove (3a) and a tyre equator (C), for example. The inner crown main groove (3d) in this embodiment is arranged between the tyre equator (C) and the inner shoulder main groove (3b).

Thereby, in the tread portion 2 in this embodiment, an outer shoulder land region 5A, an inner shoulder land region 5B, an outer middle land region 5c, an inner middle land region 5D, and a crown land region 5E are formed. The outer shoulder land region 5A in this embodiment is arranged on the outer side of the vehicle of the outer shoulder main groove (3a). The inner shoulder land region 5B in this embodiment is arranged on the inner side of the vehicle of the inner shoulder main groove (3b). The outer middle land region 5c in this embodiment is arranged between the outer shoulder main groove (3a) and the outer crown main groove (3c). The inner middle land region 5D in this embodiment is arranged between the inner shoulder main groove (3b) and the inner crown main groove (3d). The crown land region 5E in this embodiment is arranged between the outer crown main groove (3c) and the inner crown main groove (3d).

Each of the shoulder land regions 5A and 5B includes an outer region (As), a middle region (Am), and an inner region (Ai). Each of the outer regions (As) is a region of 10% of the tread width TW axially outward from the outer tread edge (To) or the inner tread edge (Ti). Each of the middle regions (Am) is a region of 10% of the tread width TW axially inward from the outer tread edge (To) or the inner tread edge (Ti). Each of the inner region (Ai) is a region between the respective middle region (Am) and the outer shoulder main groove (3a) or the inner shoulder main groove (3b).

Each of the outer shoulder land region 5A and the inner shoulder land region 5B includes a tread edge region (At) which is a region of 10% of the tread width TW on both sides in the tyre axial direction of a respective one of the tread edges (To) and (Ti) being as a center thereof in the tyre axial direction.

As a result of various experiments conducted by inventor(s) of the present invention, it has been found that a region of 10% of the tread width axially inward from each of the tread edges (To) and (Ti) is a region to which large lateral force is applied during cornering, compared to a region on the inner side of this region. Thereby, it has been found that if this region is provided with a main groove extending in the tyre circumferential direction, for example, the lateral force cannot be supported, which is disadvantageous for improving the steering stability performance. Therefore, in the present invention, the middle region (Am) is provided in the region of 10% of the tread width TW axially inward from each of the tread edges (To) and (Ti), the inner region (Ai) is provided on the inner side in the tyre axial direction of the middle region (Am), and these regions are connected with each other, thereby, the steering stability performance is ensured.

Further, it has been found that the region of 10% of the tread width TW axially outward from each of the tread edges (To) and (Ti) is a part to be in contact with the ground during cornering, therefore, is a part affecting the steering stability performance. Thereby, in the present invention, the region of 10% of the tread width TW axially outward from each of the tread edges (To) and (Ti) is defined as the outer region (As).

The outer shoulder land region 5A is provided with a plurality of outer shoulder sipes 7 having components in the tyre axial direction. The outer shoulder sipes 7 configured as such decrease rigidity of the outer shoulder land region 5A to increase absorbability of vibration during running, therefore, they are helpful for improving the ride comfort performance and the noise performance. In this specification, a sipe (including a sipe to be described later) is defined as an incision having a maximum opening width of less than 1.5 mm at a ground contacting surface (2a) of the tread portion 2, and is distinguished from a groove having the maximum opening width of more than 1.5 mm.

In the outer shoulder land region 5A in this embodiment, a sipe ratio (Rm) of the middle region (Am) is smaller than a sipe ratio (Rs) of the outer region (As) and a sipe ratio (Ri) of the inner region (Ai). Note that each of the sipe ratios (R) is, in a respective one of the outer region (As), the middle region (Am), and the inner region (Ai), a ratio of a total opening area of the outer shoulder sipes 7 included in the respective region to a total area of the ground contacting surface of a respective one of the regions (As), (Am), and (Ai). The total area of the ground contacting surface of each of the regions (As), (Am), and (Ai) does not include surface area of the grooves arranged in a respective one of the regions (As), (Am), and (Ai).

In order to improve steering stability during cornering, it is important to increase land region rigidity of the middle region (Am) which is the region where a ground contacting length becomes long during cornering. Therefore, by adopting the sipe ratio (R) described above, the rigidity of the middle region (Am) of the outer shoulder land region 5A is relatively increased, therefore, excellent steering stability is exerted. Further, in the outer shoulder land region 5A, the outer region (As) and the inner region (Ai), which have a relatively small increase ratio of the ground contacting length during cornering compared to the middle region (Am), are configured to have relatively large sipe ratios (Rs) and (Ri). Thereby, the rigidity of these regions (As) and (Ai) is relatively decreased, therefore, the ride comfort performance and the noise performance are improved. In particular, the inner region (Ai) is adjacent to the outer shoulder main groove (3a), and when the rigidity of this inner region (Ai) is decreased, the inner region (Ai) is moderately deformed at the time of ground contacting, therefore, generation of a stationary wave in the outer shoulder main groove (3a) is suppressed. This is helpful for suppressing air column resonance sound in the outer shoulder main groove (3a).

The outer shoulder land region 5A in this embodiment is provided with a plurality of inner shoulder sipes 8 having components in the tyre axial direction. The inner shoulder sipes 8 configured as such increase the absorbability of vibration during running, therefore, they are helpful for further improving the ride comfort performance and the noise performance.

In the inner shoulder land region 5B, it is preferred that the sipe ratio (Rm) of the middle region (Am) is smaller than the sipe ratio (Rs) of the outer region (As) and the sipe ratio (Ri) of the inner region (Ai). Thereby, the same effect as the effect by the sipe ratio (R) set in the outer shoulder land region 5A is exerted, therefore, the steering stability performance is further improved and the decrease of the ride comfort performance and the noise performance is further suppressed.

As described above, in this embodiment, the sipe ratio (R) described above is set in the outer shoulder land region 5A and the inner shoulder land region 5B. However, the present invention is not limited to such an embodiment, and the sipe ratio (R) may be set only in the outer shoulder land region 5A to which relatively large lateral force is applied during cornering, for example. Further, the sipe ratio (R) may be set only in the inner shoulder land region 5B.

In the outer shoulder land region 5A and the inner shoulder land region 5B, it is preferred that a sipe ratio ratio is 70% or less. The sipe ratio ratio is a ratio of the sipe ratio (Rm) of the middle region (Am) to the sipe ratio (Rs) of the outer region (As) and a ratio of the sipe ratio (Rm) of the middle region (Am) to the sipe ratio (Ri) of the inner region (Ai). When the sipe ratio ratio is more than 70%, effect of suppressing the decrease of the ride comfort performance and the noise performance becomes small in the inner region (Ai) and the outer region (As). Alternatively, the land region rigidity of the middle region (Am) is decreased, therefore, it is possible that the steering stability performance is deteriorated. From such a point of view, in the outer shoulder land region 5A and the inner shoulder land region 5B, the sipe ratio ratio is more preferably 60% or less, and further preferably 50% or less. In order to improve the steering stability performance, the ride comfort performance, and the noise performance in a good balance, it is preferred that the sipe ratio ratio is 20% or more in the outer shoulder land region 5A. Further, it is preferred that the sipe ratio ratio of the inner shoulder land region 5B is smaller than the sipe ratio ratio of the outer shoulder land region 5A.

Larger lateral force is applied to the outer region (As) during cornering than the inner region (Ai). Thereby, in the outer shoulder land region 5A and the inner shoulder land region 5B, increasing the rigidity of the outer region (As) more than the rigidity of the inner region (Ai) is helpful for further improvement of the steering stability performance. Therefore, in the outer shoulder land region 5A and the inner shoulder land region 5B, it is preferred that the sipe ratio (Rs) of the outer region (As) is smaller than the sipe ratio (Ri) of the inner region (Ai).

Although not particularly limited, in order to improve the steering stability performance, it is preferred that each of a width (wj) in the tyre axial direction of the inner region (Ai) of the outer shoulder land region 5A and a width (wi) in the tyre axial direction of the inner region (Ai) of the inner shoulder land region 5B is in a range of from 4% to 12% of the tread width TW, for example.

Each of the main grooves 3 in this embodiment extends linearly. The main grooves 3 are not limited to such an embodiment, and they may be configured to extend in a wavy or zigzag manner, for example.

It is preferred that a groove width wl of each of the main grooves 3 is in a range of from 2% to 10% of the tread width TW, for example. It is preferred that a groove depth (not shown) of each of the main grooves 3 is in a range of from 5 to 12 mm, for example.

Figure 2:
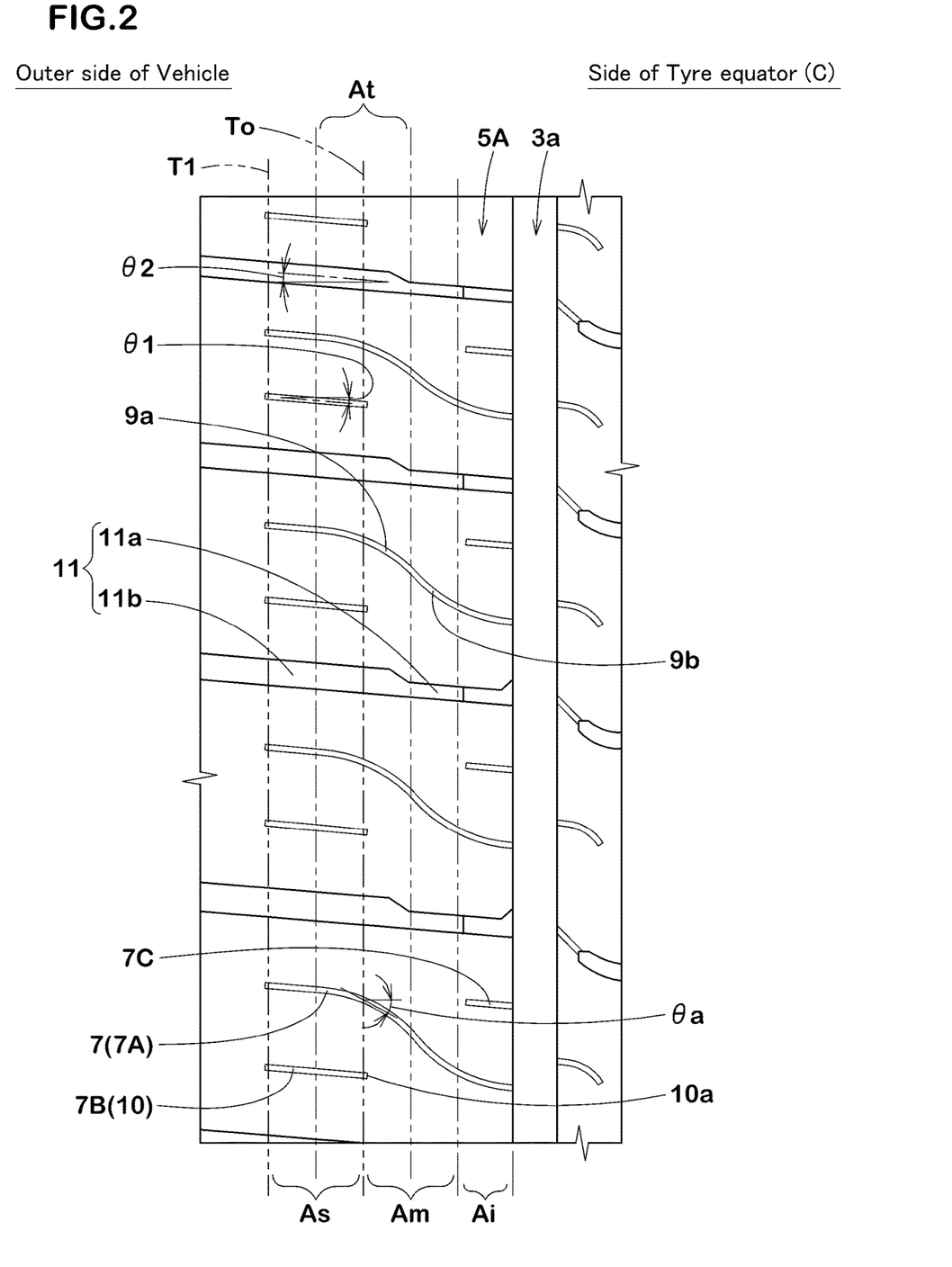
FIG. 2 is an enlarged view of an outer shoulder land region of FIG. 1.

FIG. 2 is an enlarged view of the outer shoulder land region 5A of FIG. 1. As shown in FIG. 2, the outer shoulder land region 5A includes main sipes 7A and edge sipes 7B. Each of the main sipes 7A extends so as to cross the middle region (Am). Each of the edge sipes 7B has one end in the tread edge region (At). The edge sipes exert effect of securing the rigidity of the tread edge region (At) which is to be often in contact with the ground and to which especially large lateral force is applied and the vibration absorbing effect in a good balance.

Each of the main sipes 7A extends in a curved manner in the middle region (Am). The main sipes 7A configured as such suppress opening (deformation) of the sipes caused by the lateral force, therefore, the land region rigidity of the middle region (Am) is maintained high, thereby, it is helpful for improving the steering stability performance.

Each of the main sipes 7A in this embodiment includes a first arcuate portion (9a) and a second arcuate portion (9b). The first arcuate portion (9a) is an arc convex toward one side (upper side in the figure) in the tyre circumferential direction and the second arcuate portion (9b) is an arc convex toward the opposite side (lower side in the figure) to the first arcuate portion (9a). The main sipes 7A configured as such effectively exert the above-described effects.

Each of the main sipes 7A extends so as to connect between the outer shoulder main groove (3a) and an outer edge T1 on the outer side of the vehicle of the outer region (As), for example. The main sipes 7A configured as such increase the sipe ratio (Rs) of the outer region (As) and the sipe ratio (Ri) of the inner region (Ai), therefore, it is possible that the noise performance and the ride comfort performance are improved.

It is preferred that each of the main sipes 7A has an angle ($\theta a$) in a range of from 35 to 55 degrees with respect to the tyre axial direction on the outer tread edge (To). When the angle ($\theta a$) is less than 35 degrees, the rigidity in the tyre axial direction of the outer shoulder land region 5A in the vicinity of the outer tread edge (To) is maintained high, therefore, deformation of the outer region (As) during cornering is suppressed, thereby, it is possible that the decrease of the ride comfort performance and the noise performance cannot be suppressed. When the angle (θa) is more than 55 degrees, the rigidity in the tyre axial direction of the outer shoulder land region 5A in the vicinity of the outer tread edge (To) becomes small, therefore, it is possible that the steering stability performance is deteriorated.

The edge sipes 7B include first edge sipes 10 each has one end (10a) on the inner side in the tyre axial direction of the outer tread edge (To) and extends therefrom outwardly in the tyre axial direction. Each of the first edge sipes 10 in this embodiment extends beyond the outer edge T1 of the outer region (As). In other words, each of the first edge sipes 10 extends so as to cross the outer region (As). The first edge sipes 10 configured as such are helpful for decreasing the rigidity of the outer region (As). The first edge sipes 10 extends linearly, for example, therefore, excessive decrease in the rigidity of the outer shoulder land region 5A to which large lateral force is applied is suppressed.

The outer shoulder sipes 7 in this embodiment further includes semi-open type outer shoulder sub sipes 7c. Each of the outer shoulder sub sipes 7c in this embodiment extends linearly. Each of the outer shoulder sub sipes 7c in this embodiment extends toward the outer side of the vehicle from the outer shoulder main groove (3a) to terminate within the inner region (Ai). The outer shoulder sipes 7 configured as such maintain the rigidity of the middle region (Am) high and effectively suppress the generation of the stationary wave in the outer shoulder main groove (3a).

The outer shoulder land region 5A in this embodiment is provided with outer shoulder lateral grooves 11 each extending so as to cross the outer shoulder land region 5A. The outer shoulder lateral grooves 11 configured as such increase the vibration absorbing effect of the outer shoulder land region 5A, therefore, the air column resonance sound in the outer shoulder main groove (3a) is decreased.

Each of the outer shoulder lateral grooves 11 in this embodiment includes a narrow portion (11a) and a wide portion (11b). The narrow portion (11a) is arranged on the inner side in the tyre axial direction of the tread edge region (At) and the wide portion (11b) includes a part of the tread edge region (At), that is the wide portion (11b) is partially arranged in the tread edge region (At), and the wide portion (11b) has a larger groove width than the narrow portion (11a) on the outer side of the vehicle of the tread edge region (At). The outer shoulder lateral grooves 11 configured as such decrease the area of the ground contacting surface of the outer region (As), therefore, they are helpful for making the sipe ratio (Ri) of the inner region (Ai) smaller than the sipe ratio (Rs) of the outer region (As).

The outer shoulder lateral grooves 11 in this embodiment are inclined in the same direction as the outer shoulder sipes 7. Specifically, each of the outer shoulder lateral grooves 11 is inclined at substantially the same angle as each of the first edge sipes 10 and the outer shoulder sub sipes 7c. The expression "substantially the same" here means that an absolute value |θ1−θ2| of a difference between an angle θ2 of each of the outer shoulder lateral grooves 11 with respect to the tyre axial direction and an angle θ1 of each the first edge sipes 10 and the outer shoulder sub sipes 7c of the outer shoulder sipes 7 with respect to the tyre axial direction is 10 degrees or less.

Figure 3:
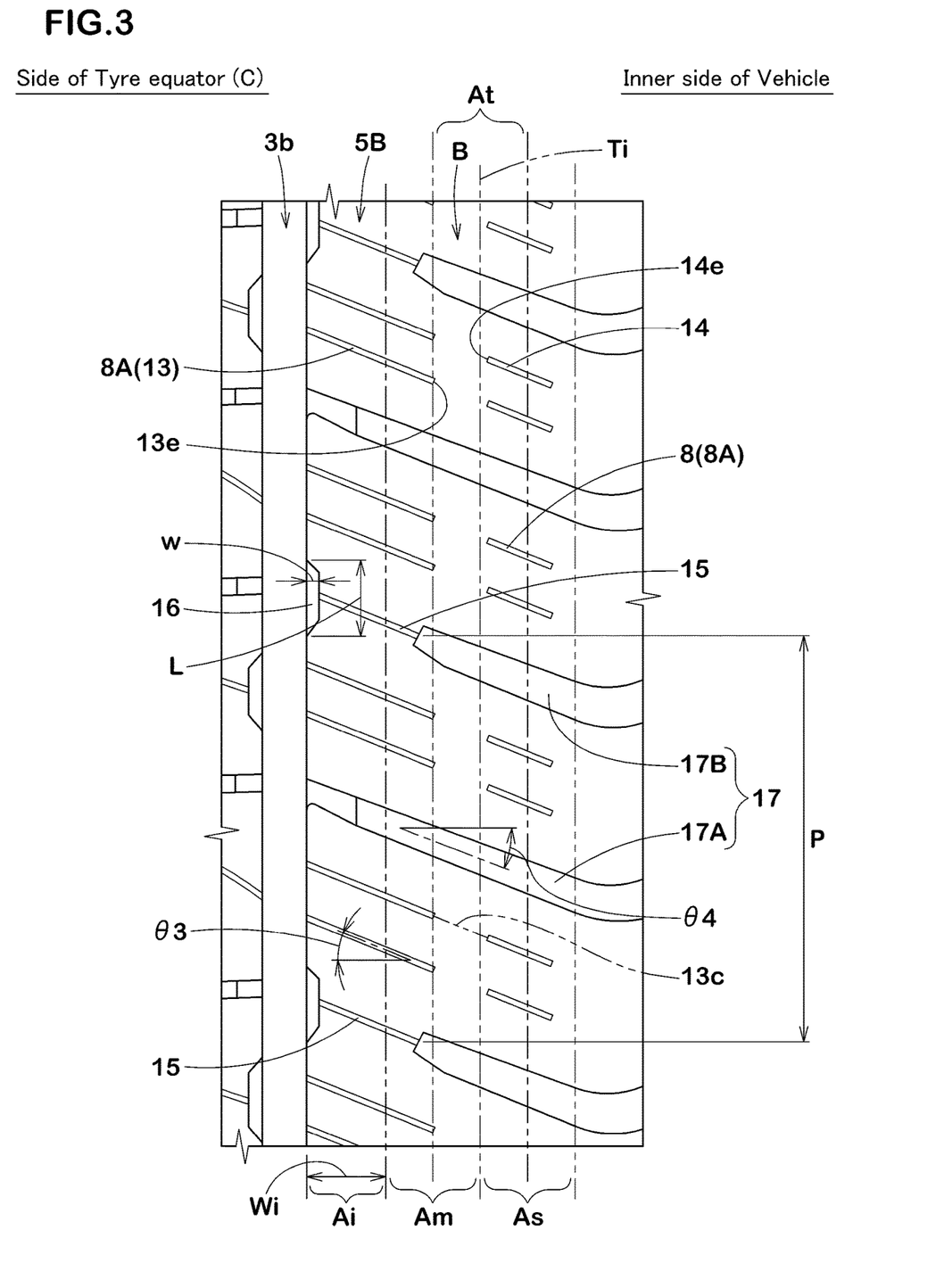
FIG. 3 is an enlarged view of an inner shoulder land region of FIG. 1.

FIG. 3 is an enlarged view of the inner shoulder land region 5B of FIG. 1. As shown in FIG. 3, the inner shoulder land region 5B includes edge sipes 8A each having one end in the tread edge region (At).

The edge sipes 8A in this embodiment include second edge sipes 13 and third edge sipes 14. Each of the second edge sipes 13 in this embodiment has one end (13e) arranged on the inner side in the tyre axial direction of the inner tread edge (Ti) and extends axially inwardly therefrom. Each of the third edge sipes 14 in this embodiment has one end (14e) arranged on the outer side in the tyre axial direction of the inner tread edge (Ti) and extends axially outwardly therefrom. Further, the inner shoulder land region 5B in this embodiment has a region extending in the tyre circumferential direction where no other sipes are arranged between the one ends (13e) of the second edge sipes 13 and the one ends (14e) of the third edge sipes 14. As described above, in the inner shoulder land region 5B in this embodiment, a region (B) is formed in which no sipes are provided in the tyre circumferential direction between the one ends (13e) of the second edge sipes 13 and the one ends (14e) of the third edge sipes 14. The region (B) in this embodiment is provided in the middle region (Am) on the inner side in the tyre axial direction of the inner tread edge (Ti). The region (B) configured as such maintains the rigidity of the middle region (Am) of the inner shoulder land region 5B, therefore, it is helpful for improving the steering stability performance.

Each of the second edge sipes 13 in this embodiment is connected with the inner shoulder main groove (3b). The second edge sipes 13 configured as such suppress air column resonance in the inner shoulder main groove (3b). Each of the second edge sipes 13 extends linearly and is inclined toward one side in the tyre axial direction, for example. Note that the second edge sipes 13 are not limited to such an embodiment, and they may extend in a wavy or zigzag manner, for example.

Each of the third edge sipes 14 in this embodiment is arranged on an imaginary line (13c) obtained by smoothly extending a respective one of the second edge sipes 13 toward the inner side of the vehicle. The third edge sipes 14 configured as such promote opening (deformation) of the inner shoulder sipes 8, therefore, the land region rigidity of the outer region (As) and the inner region (Ai) is decreased, thereby, they are helpful for improving the ride comfort performance and the noise performance.

The inner shoulder sipes 8 further includes inner shoulder sub sipes 15 arranged on a side of the tyre equator (C) of the tread edge region (At). Each of the inner shoulder sub sipes 15 in this embodiment extends from the inner shoulder main groove (3b) toward the inner side of the vehicle and terminates within the middle region (Am). In other words, each of the inner shoulder sub sipes 15 extends so as to cross the inner region (Ai). Thereby, the inner shoulder sub sipes 15 are helpful for suppressing the air column resonance sound in the inner shoulder main groove (3b).

The inner shoulder sub sipes 15 are inclined in the same direction as the second edge sipes 13 with respect to the tyre axial direction, for example. Thereby, the deformation of the inner region (Ai) is promoted, therefore, the ride comfort performance is improved and the generation of the stationary wave in the inner shoulder main groove (3b) is suppressed. In order to effectively exert such an effect, the second edge sipes 13 and the inner shoulder sub sipes 15 in this embodiment extend in parallel.

Each of the inner shoulder sub sipes 15 is connected with a respective one of chamfered portions 16 formed by chamfering one of groove walls of the inner shoulder main groove (3b). The chamfered portions 16 increase rigidity difference in the vicinity of the groove wall of the inner shoulder main groove (3b), therefore, the deformation of the inner region (Ai) of the inner shoulder land region 5B is promoted, thereby, the generation of the stationary wave in the inner shoulder main groove (3b) is further suppressed.

Although not particularly limited, it is preferred that a width (w) in the tyre axial direction of each of the chamfered portions 16 is in a range of from 10% to 20% of the width (Wi) in the tyre axial direction of the inner region (Ai). Further, it is preferred that a length (L) in the tyre circumferential direction of each of the chamfered portions 16 is in a range of from 10% to 25% of a pitch (P) in the tyre circumferential direction between the inner shoulder sub sipes 15 adjacent to each other. It is preferred that a maximum height (not shown) of each of the chamfered portions 16 is in a range of from 25% to 75% of the groove depth of the inner shoulder main groove (3b), for example.

The inner shoulder land region 5B is provided with inner shoulder lateral grooves 17. Each of the inner shoulder lateral grooves 17 in this embodiment extends linearly in the inner shoulder land region 5B. The inner shoulder lateral grooves 17 in this embodiment are inclined in the same direction as the inner shoulder sipes 8. Each of the inner shoulder lateral grooves 17 is inclined at substantially the same angle as each of the inner shoulder sipes 8. The expression "substantially the same" here means that an absolute value |θ3−θ4| of a difference between an angle θ4 of each of the inner shoulder lateral grooves 17 with respect to the tyre axial direction and an angle θ3 of each the second edge sipes 13 of the inner shoulder sipes 8 with respect to the tyre axial direction is 10 degrees or less.

The inner shoulder lateral grooves 17 include first inner shoulder lateral grooves 17A and second inner shoulder lateral grooves 17B, for example. Each of the first inner shoulder lateral grooves 17A extends so as to cross the inner shoulder land region 5B and each of the second inner shoulder lateral grooves 17B extends from outer side of vehicle of the outer region (As) toward the side of the tyre equator (C) and terminates within the inner shoulder land region 5B, for example.

Each of the second inner shoulder lateral grooves 17B in this embodiment terminates between the tread edge region (At) and the inner region (Ai) and is connected with a respective one of the inner shoulder sub sipes 15. The second inner shoulder lateral grooves 17B configured as such promote the deformation of the inner shoulder sub sipes 15, therefore, the generation of the stationary wave in the inner shoulder main groove (3b) is further suppressed.

Figure 4:
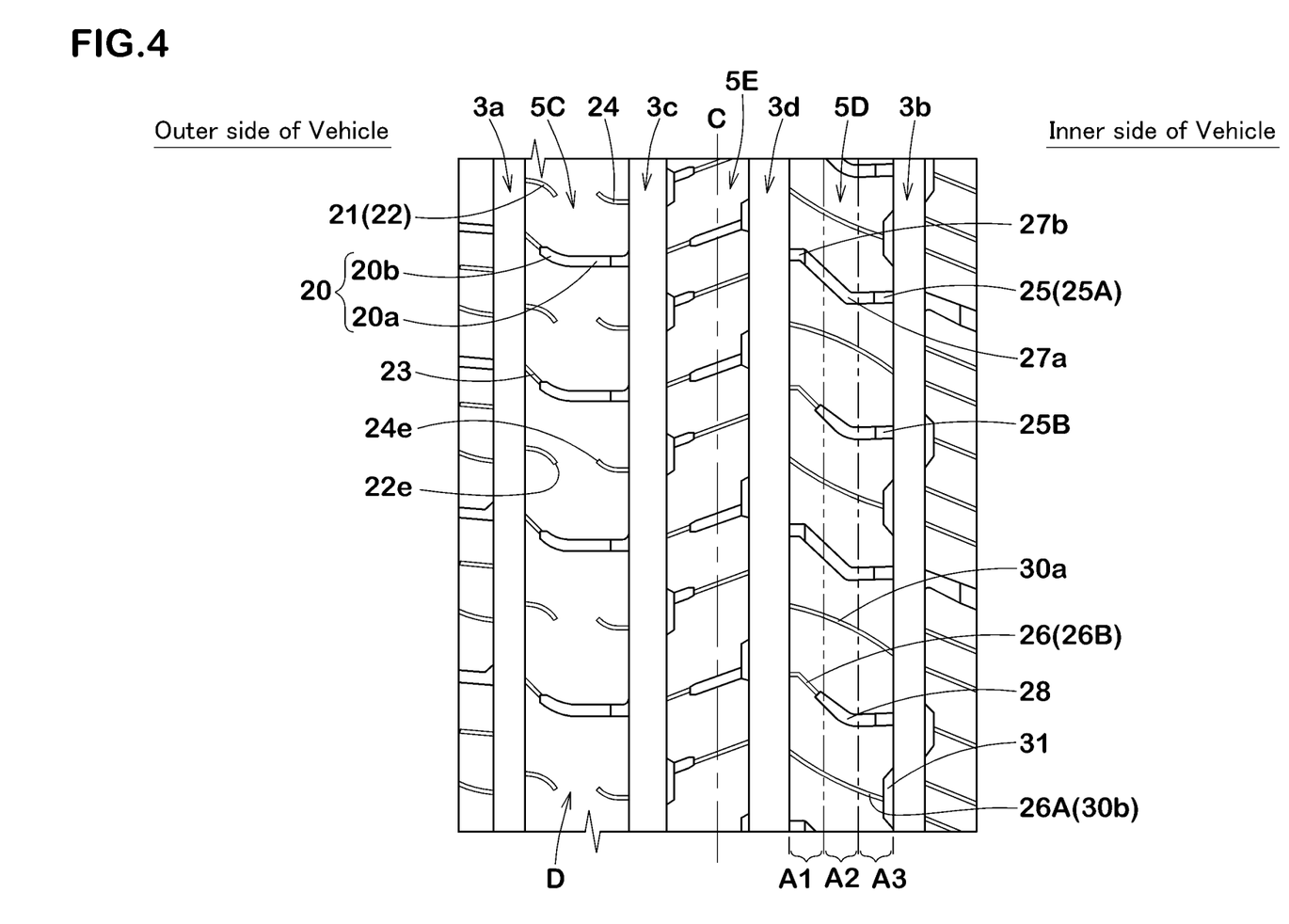
FIG. 4 is an enlarged view of an outer middle land region and an inner middle land region of FIG. 1.

FIG. 4 is an enlarged view of the outer middle land region 5c and the inner middle land region 5D. As shown in FIG. 4, the outer middle land region 5c is provided with outer middle lateral grooves 20 extending in the tyre axial direction and outer middle sipes 21 extending in the tyre axial direction.

Each of the outer middle lateral grooves 20 extends from the outer crown main groove (3c) toward the outer side of the vehicle and terminates within the outer middle land region 5c. Each of the outer middle lateral grooves 20 includes a linear portion (20a) extending linearly along the tyre axial direction and an arcuate portion (20b) smoothly connected with the linear portion (20a) and extending in an arc shape. The outer middle lateral grooves 20 configured as such moderately change the rigidity of the outer middle land region 5c.

The outer middle sipes 21 are inclined with respect to the tyre axial direction. The outer middle sipes 21 in this embodiment include first outer middle sipes 22, second outer middle sipes 23, and third outer middle sipes 24. Each of the first outer middle sipes 22 extends from the outer shoulder main groove (3a) toward the side of the tyre equator (C) to terminate within the outer middle land region 5C. Each of the second outer middle sipes 23 extends from the outer shoulder main groove (3a) toward the side of the tyre equator (C) to be connected with a respective one of the arcuate portions (20b). Each of the third outer middle sipes 24 extends from the outer crown main groove (3c) toward the outer side of the vehicle to terminate within the outer middle land region 5C.

Each of the first outer middle sipes 22 is configured to have an arc shape convex toward one side (upper side in the figure) in the tyre circumferential direction. The first outer middle sipes 22 are inclined with respect to the tyre axial direction. The second outer middle sipes 23 are inclined in the same direction as the first outer middle sipes 22 and each extend linearly. Each of the third outer middle sipes 24 is configured to have an arc shape convex toward the opposite direction (lower side in the figure) to the first outer middle sipes 22. The third outer middle sipes 24 are inclined in the same direction as the arcuate portions (20b). The outer middle sipes 21 configured as such suppress the air column resonance sound in the outer shoulder main groove (3a) and the outer crown main groove (3c).

The outer middle land region 5C is provided with a region (D) extending in the tyre circumferential direction where no sipes are arranged between one ends (22e) on the side of the tyre equator (C) of the first outer middle sipes 22 and one ends (24e) on the outer side of the vehicle of the third outer middle sipes 24. Thereby, the rigidity of the inner side (center side) of the outer middle land region 5c is maintained high, therefore, excellent steering stability performance is exerted.

When the inner middle land region 5D is divided into three equal parts in the tyre axial direction, the inner middle land region 5D is divided into a first region A1 positioned outermost of the vehicle, a second region A2 adjacent to the first region A1, and a third region A3 positioned innermost of the vehicle.

The inner middle land region 5D in this embodiment includes inner middle lateral grooves 25 and inner middle sipes 26. The inner middle lateral grooves 25 include first inner middle lateral grooves 25A and second inner middle lateral grooves 25B, for example. Each of the first inner middle lateral grooves 25A extends so as to cross the inner middle land region 5D and each of the second inner middle lateral grooves 25B extends from the inner shoulder main groove (3b) toward the side of the tyre equator (C) to terminate within the inner middle land region 5D, for example.

Each of the first inner middle lateral grooves 25A extends in a bent manner so as to have a first apex portion (27a) and a second apex portion (27b). The first apex portion (27a) protrudes toward one side in the tyre circumferential direction and the second apex portion (27b) is arranged on the outer side of the vehicle of the first apex portion (27a) and protrudes toward the other side in the tyre circumferential direction. The first inner middle lateral grooves 25A configured as such decrease the land region rigidity of the inner middle land region 5D, therefore, they are helpful for improving the ride comfort performance and the noise performance.

The first apex portions (27a) are arranged in the second region A2 and the second apex portions (27b) are arranged in the first region A1. The first apex portions (27a) and the second apex portions (27b) relatively decrease the rigidity of regions around them. The first apex portions (27a) and the second apex portions (27b) in this embodiment are arranged on the side of the tyre equator (C) in the inner middle land region 5D, therefore, the rigidity of an axially outer part of the inner middle land region 5D is secured high. Thereby, the steering stability performance is improved.

Each of the second inner middle lateral grooves 25B in this embodiment extends in a bent manner so as to have an apex portion 28 convex toward the other side in the tyre circumferential direction. The apex portions 28 are arranged in the second region A2 and not arranged in the third region A3. Thereby, the above-described effects are exerted more effectively.

The inner middle sipes 26 in this embodiment include arcuate sipes 26A and bent sipes 26B. Each of the arcuate sipes 26A extends so as to cross the inner middle land region 5D in an arc shape and each of the bent sipes 26B extends in a bent manner with respect to the tyre axial direction.

The arcuate sipes 26A include first arcuate sipes (30a) each having an arc convex toward one side in the tyre circumferential direction and second arcuate sipes (30b) each having an arc convex toward the opposite side to the first arcuate sipes (30a). The arcuate sipes 26A configured as such improve the ride comfort performance and the noise performance. The first arcuate sipes (30a) and the second arcuate sipes (30b) in this embodiment are arranged alternately in the tyre circumferential direction.

Each of the second arcuate sipes (30b) in this embodiment is connected with a respective one of chamfered portions 31 formed by chamfering one of groove walls of the inner shoulder main groove (3b). Thereby, the rigidity difference in the vicinity of the groove wall of the inner shoulder main groove (3b) is increased, therefore, the generation of the stationary wave in the inner shoulder main groove (3b) is further suppressed.

Unlike the second arcuate sipes (30b), the first arcuate sipes (30a) in this embodiment are connected with the inner shoulder main groove (3b) without having chamfered portions therebetween. The first arcuate sipes (30a) are not limited to such an embodiment, and they may be connected with chamfered portions, for example.

Each of the arcuate sipes 26A in this embodiment is continuously inclined toward the other side in the tyre circumferential direction as it goes toward the inner side of the vehicle. The arcuate sipes 26A configured as such suppress excessive decrease in the land region rigidity of the inner middle land region 5D, therefore, the steering stability performance is maintained high.

Each of the bent sipes 26B connects between a respective one of the second inner middle lateral grooves 25B and the inner crown main groove (3d). The bent sipes 26B configured as such promote deformation of the inner middle land region 5D on a side of the inner crown main groove (3d).

Figure 5:
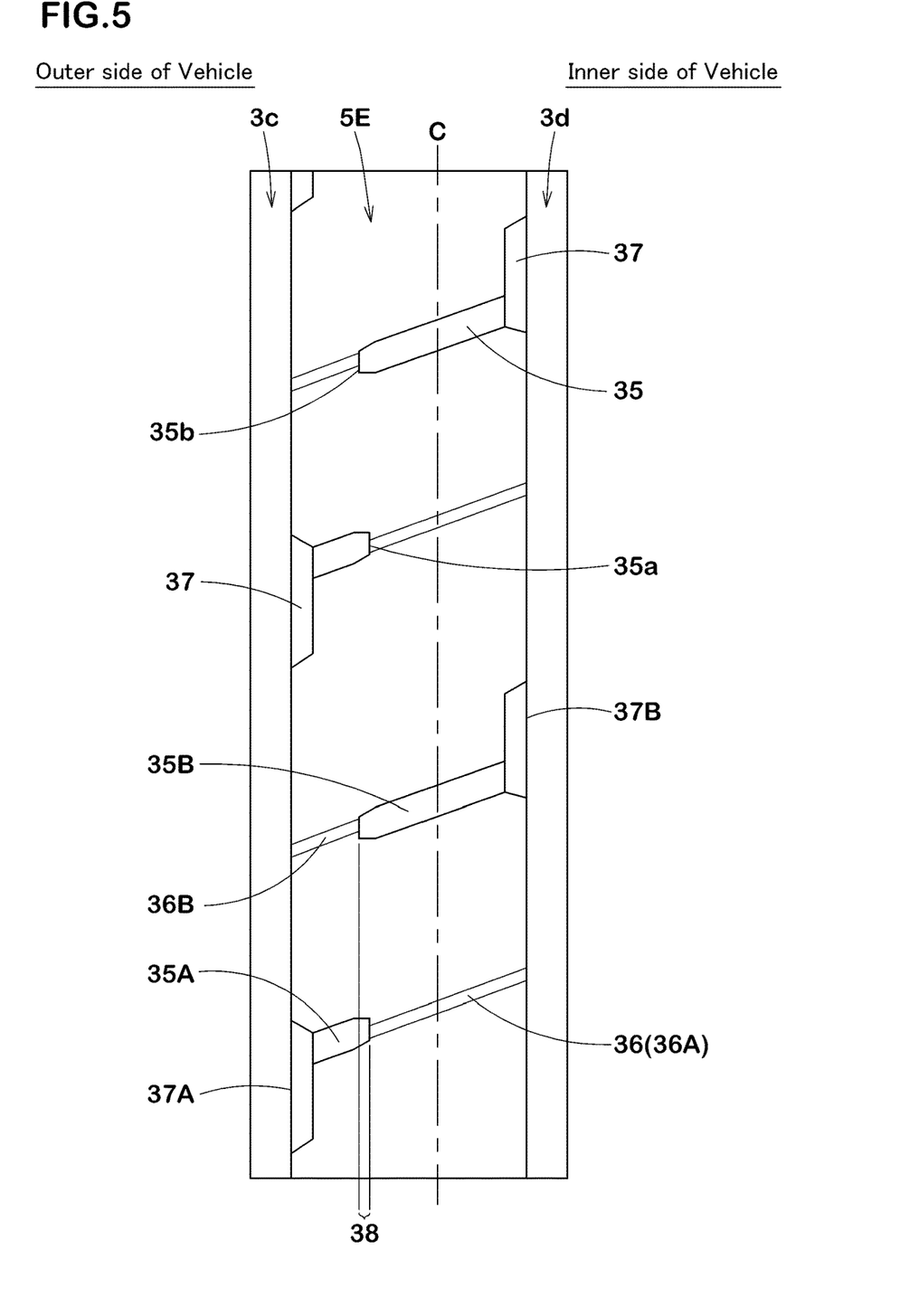
FIG. 5 is an enlarged view of a crown land region of FIG. 1.

FIG. 5 is an enlarged view of the crown land region 5E. As shown in FIG. 5, the crown land region 5E in this embodiment is provided with crown lateral grooves 35 and crown sipes 36.

The crown lateral grooves 35 in this embodiment include first crown lateral grooves 35A and second crown lateral grooves 35B. Each of the first crown lateral grooves 35A in this embodiment extends from the outer crown main groove (3c) toward the inner side of the vehicle to terminate within the crown land region 5E. Each of the second crown lateral grooves 35B in this embodiment extends from the inner crown main groove (3d) toward the outer side of the vehicle to terminate within the crown land region 5E.

Each of the crown lateral grooves 35 in this embodiment extends linearly to be connected with a respective one of chamfered portions 37 formed by chamfering groove walls of the main grooves 3. The chamfered portions 37 include first chamfered portions 37A and second chamfered portions 37B. Each of the first chamfered portions 37A connects between a respective one of the first crown lateral grooves 35A and the outer crown main groove (3c) and each of the second chamfered portions 37B connects between a respective one of the second crown lateral grooves 35B and the inner crown main groove (3d).

An inner end (35a) on the inner side of the vehicle of each of the first crown lateral grooves 35A is positioned on the inner side of the vehicle of an inner end (35b) on the outer side of the vehicle of each of the second crown lateral grooves 35B. In other words, when viewed in the tyre circumferential direction, the crown land region 5E is provided with an overlapping portion 38 where the first crown lateral grooves 35A overlap with the second crown lateral grooves 35B.

The overlapping portion 38 is positioned on the outer side of the vehicle of the tyre equator (C). Thereby, the crown land region 5E deforms more moderately on the outer side of the vehicle than on the inner side of the vehicle, therefore, the air column resonance sound is suppressed more in the outer crown main groove (3c) than in the inner crown main groove (3d) as the outer crown main groove (3c) is arranged on the outer side of the vehicle where the noise performance is affected more.

Each of the crown sipes 36 in this embodiment is connected with a respective one of the crown lateral grooves 35 and extends linearly therefrom. The crown sipes 36 include first crown sipes 36A and second crown sipes 36B. Each of the first crown sipes 36A connects between a respective one of the first crown lateral grooves 35A and the inner crown main groove (3d) and each of the second crown sipes 36B connects between a respective one of the second crown lateral grooves 35B and the outer crown main groove (3c). The crown sipes 36 configured as such promote deformation of each of the main grooves (3c) and (3d).

While detailed description has been made of the tyre as an embodiment of the present invention, it is needless to say that the present invention can be embodied in various forms without being limited to the illustrated embodiment.

Working Examples (Examples)

Tyres of size 265/50R22 having the basic pattern shown in FIG. 1 were made by way of test according to the specifications listed in Table 1, and then each of the test tyres was tested for the steering stability performance, the ride comfort performance, and the noise performance. Common specifications of the test tyres and the test methods were as follows.

<Steering Stability Performance, Ride Comfort Performance, Noise Performance>

Each of the test tyres were mounted on a test vehicle described below and a test driver drove the test vehicle on a dry asphalt road surface and a rough road surface of a test course. During the test drive, the steering stability performance related to stability during cornering, the ride comfort performance related to a longitudinal spring, and the noise performance related to tyre noise were evaluated by the driver's feeling. The test results are indicated by an evaluation point based on a value of Reference 1 being 100, wherein the larger the numerical value, the better the performances are, and the value of 95 or higher can be judged as good.

Tyre rim: 22×8.53
Tyre inner pressure: 230 kPa
Tyre mounting position: all wheels
Test vehicle: SUV with displacement of 3700 cc
The test results and the like are shown in Table 1.

TABLE 1

|  | Ref. 1 | Ex. 1 | Ex. 2 | Ex. 3 | Ex. 4 | Ex. 5 |
|---|---|---|---|---|---|---|
| Sipe ratio of Outer shoulder land region | Rm = Ri<br>Rm = Rs | Rm < Ri<br>Rm < Rs | Rm < Ri<br>Rm < Rs | Rm < Ri<br>Rm < Rs | Rm < Ri<br>Rm < Rs | Rm < Ri<br>Rm < Rs |
| Sipe ratio of Inner shoulder land region | Rm = Ri<br>Rm = Rs | Rm = Ri<br>Rm = Rs | Rm < Ri<br>Rm < Rs | Rm < Ri<br>Rm < Rs | Rm < Ri<br>Rm < Rs | Rm < Ri<br>Rm < Rs |
| Sipe ratio ratio (Rm/Ri, Rm/Rs) of Outer shoulder land region [%] | 100 | 70 | 70 | 80 | 70 | 70 |
| Sipe ratio ratio (Rm/Ri, Rm/Rs) of Inner shoulder land region [%] | 100 | 100 | 70 | 80 | 70 | 70 |
| Angle (θa) of Main sipe [degree] | 45 | 45 | 45 | 45 | 35 | 55 |
| Steering stability performance [evaluation point: larger is better] | 100 | 115 | 120 | 115 | 120 | 116 |
| Ride comfort performance [evaluation point: larger is better] | 100 | 98 | 96 | 97 | 96 | 100 |
| Noise performance [evaluation point: larger is better] | 100 | 98 | 98 | 99 | 98 | 98 |

From the test results, it was confirmed that the steering stability performance was improved and the decrease in the ride comfort performance and the noise performance was suppressed for the tyres as Examples compared with the tyres as the Reference.

The invention claimed is:

1. A tyre comprising a tread portion wherein when the tread portion position for mounting the tyre on a vehicle is specified regarding inner and outer sides of the tread portion with respect to the vehicle, the tread portion comprises an outer shoulder main groove extending continuously in a tyre circumferential direction on a side closest to an outer tread edge with respect to the vehicle, an inner shoulder main groove extending continuously in the tyre circumferential direction on a side closest to an inner tread edge with respect to the vehicle, an outer shoulder land region formed on an outer side with respect to the vehicle and on an outer side in a tyre axial direction of the outer shoulder main groove, and an inner shoulder land region formed on an inner side with respect to the vehicle and axially outside the inner shoulder main groove, wherein
  the outer shoulder land region includes an outer region which is a region of 10% of a tread width axially outward from the outer tread edge, a middle region which is a region of 10% of the tread width axially inward from the outer tread edge, and an inner region between the middle region and the outer shoulder main groove,
  the inner shoulder land region includes an outer region which is a region of 10% of a tread width axially outward from the inner tread edge, a middle region which is a region of 10% of the tread width axially inward from the inner tread edge, and an inner region between the middle region and the inner shoulder main groove,
  each of the outer shoulder land region and the inner land region is provided with a plurality of shoulder sipes having components in the tyre axial direction,
  each of the outer regions, the middle regions, and the inner regions of the inner and the outer shoulder land regions has a sipe ratio,
  the sipe ratio is a ratio of a total opening area of the shoulder sipes to a total area of a ground contacting surface with respect to each of the outer regions, the middle regions, and the inner regions,
  the sipe ratio of the middle region is smaller than the sipe ratio of the outer region and the sipe ratio of the inner region with respect to each of the outer shoulder land region and the inner shoulder land region,
  each of the shoulder sipes arranged in the outer region of the outer shoulder land region completely crosses the outer region of the outer shoulder land region, and
  a ratio of the sipe ratio of the middle region to each of the sipe ratio of the outer region and the sipe ratio of the inner region in the inner shoulder land region is smaller than a ratio of the sipe ratio of the middle region to each of the sipe ratio of the outer region and the sipe ratio of the inner region in the outer shoulder land region.

2. The tyre according to claim 1, wherein the sipe ratio of the middle region is 70% or less of the sipe ratio of the outer region and the sipe ratio of the inner region in each of the outer shoulder land region and the inner land region.

3. The tyre according to claim 1, wherein
  each of the outer shoulder land region and the inner shoulder land region includes a tread edge region which is a region of 10% of the tread width with a respective one of the outer tread edge and the inner tread edge being a center thereof in the tyre axial direction, and
  in each of the outer shoulder land region and the inner shoulder land region, the plurality of the shoulder sipes include edge sipes each having one end in the tread edge region.

4. The tyre according to claim 3, wherein
  the edge sipes of the outer shoulder land region include a first edge sipe having one end arranged on an inner side in the tyre axial direction of the outer tread edge and extending axially outwardly therefrom.

5. The tyre according to claim 4, wherein the plurality of the shoulder sipes includes a main sipe crossing the middle region of the outer shoulder land region.

6. The tyre according to claim 5, wherein the main sipe extends in a curved manner in the middle region.

7. The tyre according to claim 6, wherein
  the main sipe includes a first arcuate portion and a second arcuate portion,
  the first arcuate portion is an arc convex toward one side in the tyre circumferential direction, and
  the second arcuate portion is an arc convex toward the opposite side to the first arcuate portion.

8. The tyre according to claim 5, wherein an angle of the main sipe on the tread edge with respect to the tyre axial direction is in a range of from 35 to 55 degrees.

9. The tyre according to claim 5, wherein the main sipe connects the outer shoulder main groove and an outer edge on an outer side of the vehicle of the outer region.

10. The tyre according to claim 3, wherein
  the edge sipes of the inner shoulder land region include a second edge sipe and a third edge sipe, the second edge sipe has the one end thereof arranged on the inner side in the tyre axial direction of the inner tread edge and extends axially inwardly therefrom, and the third edge sipe has the one end thereof arranged on the outer side in the tyre axial direction of the inner tread edge and extends axially outwardly therefrom.

11. The tyre according to claim 10, wherein the tread portion includes an inner middle land region adjacent in the tyre axial direction to the inner shoulder land region, the inner middle land region is provided with an inner middle lateral groove crossing the inner middle land region, the inner middle lateral groove has a first apex portion protruding toward one side in the tyre circumferential direction and a second apex portion arranged on an outer side of the vehicle of the first apex portion and protruding toward the other side in the tyre circumferential direction, when the inner middle land region is divided into three parts equally in the tyre axial direction, the inner middle land region includes a first region positioned outermost of the vehicle and a second region adjacent to the first region, the first apex portion is arranged in the second region, and the second apex portion is arranged in the first region.

12. The tyre according to claim 10, wherein the third edge sipe is arranged on an imaginary line obtained by smoothly extending the second edge sipe toward an inner side of the vehicle.

13. The tyre according to claim 1, wherein the sipe ratio of the middle region is 20% or more of the sipe ratio of the outer region and the sipe ratio of the inner region in the outer shoulder land region.

14. The tyre according to claim 1, wherein the sipe ratio of the outer region is smaller than the sipe ratio of the inner region in each of the outer land region and the inner land region.

15. The tyre according to claim 1, wherein in each of the outer shoulder land region and the inner shoulder land region, a width in the tyre axial direction of the inner region of the shoulder land region is in a range of from 4% to 12% of the tread width.

16. The tyre according to claim 1, wherein the shoulder sipes include a semi-open type shoulder sub sipe extending linearly from the outer shoulder main groove to terminate within the inner region of the outer shoulder land region.

17. The tyre according to claim 1, wherein the outer shoulder land region is provided with a shoulder lateral groove crossing the outer shoulder land region, the outer shoulder land region includes a tread edge region which is a region of 10% of the tread width with the outer tread edge being a center thereof in the tyre axial direction, the outer shoulder lateral groove includes a narrow portion and a wide portion, the narrow portion is arranged on an inner side in the tyre axial direction of the tread edge region, and the wide portion is arranged partially in the tread edge region on an outer side in the tyre axial direction of the narrow portion and has a larger groove width than the narrow portion.

18. The tyre according to claim 17, wherein the shoulder lateral groove and the shoulder sipes are inclined in the same direction.

19. A tyre comprising a tread portion comprising a shoulder main groove extending continuously in a tyre circumferential direction on a side closest to a tread edge and a shoulder land region formed on an outer side in a tyre axial direction of the shoulder main groove, wherein the shoulder land region includes an outer region which is a region of 10% of a tread width axially outward from the tread edge, a middle region which is a region of 10% of the tread width axially inward from the tread edge, and an inner region between the middle region and the shoulder main groove, the shoulder land region is provided with a plurality of shoulder sipes having components in the tyre axial direction, in each of the outer region, the middle region, and the inner region, when a ratio of a total opening area of the shoulder sipes included in the respective region to a total area of a ground contacting surface of the respective region is defined as a sipe ratio, the sipe ratio of the middle region is smaller than the sipe ratio of the outer region and the sipe ratio of the inner region, the shoulder land region includes a tread edge region which is a region of 10% of the tread width with the tread edge being a center thereof in the tyre axial direction, and the plurality of the shoulder sipes include edge sipes each having one end in the tread edge region, the shoulder land region includes an inner shoulder land region when the tread portion position for mounting the tyre on a vehicle is specified regarding inner and outer sides of the tread portion with respect to the vehicle, the edge sipes of the inner shoulder land region include a second edge sipe and a third edge sipe, the second edge sipe has the one end thereof arranged on the inner side in the tyre axial direction of the tread edge and extends axially inwardly therefrom, and the third edge sipe has the one end thereof arranged on the outer side in the tyre axial direction of the tread edge and extends axially outwardly therefrom, the tread portion includes an inner middle land region adjacent in the tyre axial direction to the inner shoulder land region, the inner middle land region is provided with an inner middle lateral groove crossing the inner middle land region, the inner middle lateral groove has a first apex portion protruding toward one side in the tyre circumferential direction and a second apex portion arranged on an outer side of the vehicle of the first apex portion and protruding toward the other side in the tyre circumferential direction, when the inner middle land region is divided into three parts equally in the tyre axial direction, the inner middle land region includes a first region positioned outermost of the vehicle and a second region adjacent to the first region, the first apex portion is arranged in the second region, and the second apex portion is arranged in the first region.

* * * * *